United States Patent [19]

Wilkinson, Jr. et al.

[11] Patent Number: 4,585,963
[45] Date of Patent: Apr. 29, 1986

[54] BRUSHLESS DIRECT CURRENT MOTOR WITH INVERTED MAGNET CLIP

[75] Inventors: Richard A. Wilkinson, Jr.; William C. Hunt, both of Boulder County, Colo.

[73] Assignee: Storage Technology Partners II, Louisville, Colo.

[21] Appl. No.: 659,747

[22] Filed: Oct. 11, 1984

Related U.S. Application Data

[63] Continuation-in-part of Ser. No. 437,988, Nov. 1, 1982.

[51] Int. Cl.$^4$ .............................................. H02K 7/00
[52] U.S. Cl. ...................... 310/67 R; 310/42; 310/46; 310/68 B; 310/89; 310/90; 360/97; 361/212; 29/598
[58] Field of Search ............... 310/46, 67 R, 88, 89, 310/45, 42, 90, 68 B, 43, 156, 261, 91, 157, 113; 74/573 R; 360/97, 133, 135; 29/598; 361/212

[56] References Cited

U.S. PATENT DOCUMENTS

| | | | |
|---|---|---|---|
| 2,047,838 | 7/1936 | Smith | 361/212 |
| 2,256,118 | 9/1941 | Kyropoulos | 361/212 |
| 3,458,740 | 11/1966 | Kaneko | 310/67 R |
| 3,482,125 | 12/1969 | Fleckenstein | 310/89 |
| 3,587,074 | 6/1971 | Angle | 360/97 |
| 3,596,121 | 7/1971 | Chang | 310/67 R |
| 4,097,754 | 6/1978 | Farr | 310/67 R |
| 4,117,359 | 9/1978 | Wehde | 310/67 R |
| 4,217,508 | 8/1980 | Uzuka | 310/46 |

*Primary Examiner*—R. Skudy
*Attorney, Agent, or Firm*—Woodcock Washburn Kurtz Mackiewicz & Norris

[57] ABSTRACT

A brushless direct current motor with the rotating magnet cup permanently attached to the spindle hub. After attachment, the combination spindle hub and magnet cup are affixed to the shaft and the resulting subassembly is dynamically balanced. The motor using this balanced subassembly can be assembled with no balancing required after assembly. The motor can also be disassembled for repair and reassembled without disturbing the dynamic balance. The motor includes an air seal at one end thereof and is especially useful for disk drive applications.

6 Claims, 3 Drawing Figures

BRUSHLESS DIRECT CURRENT MOTOR WITH INVERTED MAGNET CLIP

CROSS REFERENCE TO RELATED APPLICATIONS

This application is a continuation-in-part of application Ser. No. 437,988, filed Nov. 1, 1982.

BACKGROUND OF THE INVENTION

This invention relates to a brushless direct current motor, and more particularly to a brushless direct current motor designed for use with rotating disk systems. Even more particularly, the invention relates to a brushless direct current motor wherein all of the rotating components can all be balanced as a unit in one balancing operation, and wherein a static seal is used to prevent an air flow from entraining the lubricant from the bearings.

The use of brushless direct current motors in electronic equipment with rotating components, such as a magnetic disk storage system, has become common. There are two reasons for this: (1) the speed of rotation of such devices must be precisely controlled, and the brushless direct current motor, with its electronic control system, allows accurate speed control to be easily accomplished; and (2) the brushless direct current motor can be made an integral part of the mechanical support structure, thereby saving both space and cost.

In some uses of the brushless direct current motor, the rotating components of the motor must be balanced to an acceptable level. If the correct level of balance is not achieved, the electronic equipment using the motor may not function as desired, or the life of the motor may be shortened because of the stresses placed on the bearings from the wobble introduced by the imbalance.

Where the brushless direct current motor is used to drive the spindle of a disk storage system, the rotating disk pumps air and effectively lowers the air pressure (creates a vacuum) at one end of the spindle. Accordingly, unless some sort of seal is used to stop this air from being pumped into the motor housing, the air stream will entrain lubrication from the bearings. This lubrication then becomes a contaminant for the disk storage system, plus the bearings are dried out and subject to premature wear. Typically, some sort of dynamic seal is used to prevent such an air flow. For example, labyrinth, controlled gap, elastomeric mechanical contact or ferro-fluidic seals are all dynamic seals that are known in the art for use with rotating shafts. Unfortunately, these dynamic seals are costly and not always effective.

Balancing of brushless direct current motors is accomplished in the prior art by individually balancing each rotating component of the motor. The components are then assembled and the assembled unit is checked for the correct balance. Quite often, additional balancing is required.

If the motor should ever have to be disassembled, e.g., because of maintenance of the motor or the overall system in which the motor is used, additional balancing may be required when the motor is reassembled. This is because the individual components of the motor will probably not reassemble exactly as they were before disassembly. Two approaches have been used in the prior art to avoid this additional balancing step: (1) the individual motor components may be fabricated to very tight tolerances, thereby ensuring that proper balance will be obtained regardless of how the components are reassembled; or (2) keying pins and matching alignment holes may be selectively placed in the components, thereby maintaining a fixed relationship between the components each time reassembly occurs. While the use of tight tolerances and keying pins and alignment holes helps ensure that a motor can be reassembled without needing rebalancing, these approaches also disadvantageously add significantly to the cost of the motor. What is needed therefore is a low cost, simple brushless direct current motor design wherein maintaining the desired balance of the rotating components is no longer a problem, and wherein undesirable air flow into the bearings can be prevented.

SUMMARY OF THE INVENTION

It is an objective of the present invention to provide a brushless direct current motor whose rotating components can be balanced prior to assembly into the motor and which do not need additional balancing after motor assembly.

It is another objective of the present invention to provide such a motor that can be disassembled, if necessary, and reassembled without the need of balancing after reassembly.

It is still another objective of the present invention to provide a brushless direct current motor wherein air is prevented from being pulled through the bearings as the shaft rotates.

The above and other objectives are realized through a brushless direct current motor design wherein all the rotating components can be assembled as a subassembly. This subassembly is then dynamically balanced and assembled into the stationary components of the motor. Consequently, the rotating components, being in balance prior to assembly into the stationary components, and having no additional parts added, require no further balancing after assembly with the stationary components.

Further, because the rotating components of the motor are designed as a balanced subassembly, there is never a need to disassemble the subassembly. Thus, whenever disassembly of the motor is required, the balanced subassembly can be readily removed from, and re-installed into, the stationary components of the motor, yet the balanced subassembly does not require rebalancing.

The rotating components included in the balanced subassembly of the present invention comprise a shaft, a spindle hub (on which the rotating disk or disks may be mounted), and a cup assembly (wherein permanent magnetics are mounted). Unlike the prior art, wherein traditional design practice teaches that the cup assembly must be mounted at one end of the shaft using a cup adapter, and the spindle hub must be mounted at the other end of the shaft, the present invention provides a unique subassembly wherein the cup assembly and spindle hub may be advantageously mounted to the same end of the shaft. Once assembled and balanced, therefore, this subassembly need never be disassembled. A static seal is further used to seal one end of the motor to prevent air from being pumped thereinto, thereby prolonging the life of the bearings and preventing undesirable contaminants from being entrained into the load area.

BRIEF DESCRIPTION OF THE DRAWINGS

The above and other objectives, advantages and features of the present invention will become more apparent from the following description of the preferred embodiment, which is described with reference to the following drawings, wherein.

DESCRIPTION OF THE PREFERRED EMBODIMENT

Figure 1:
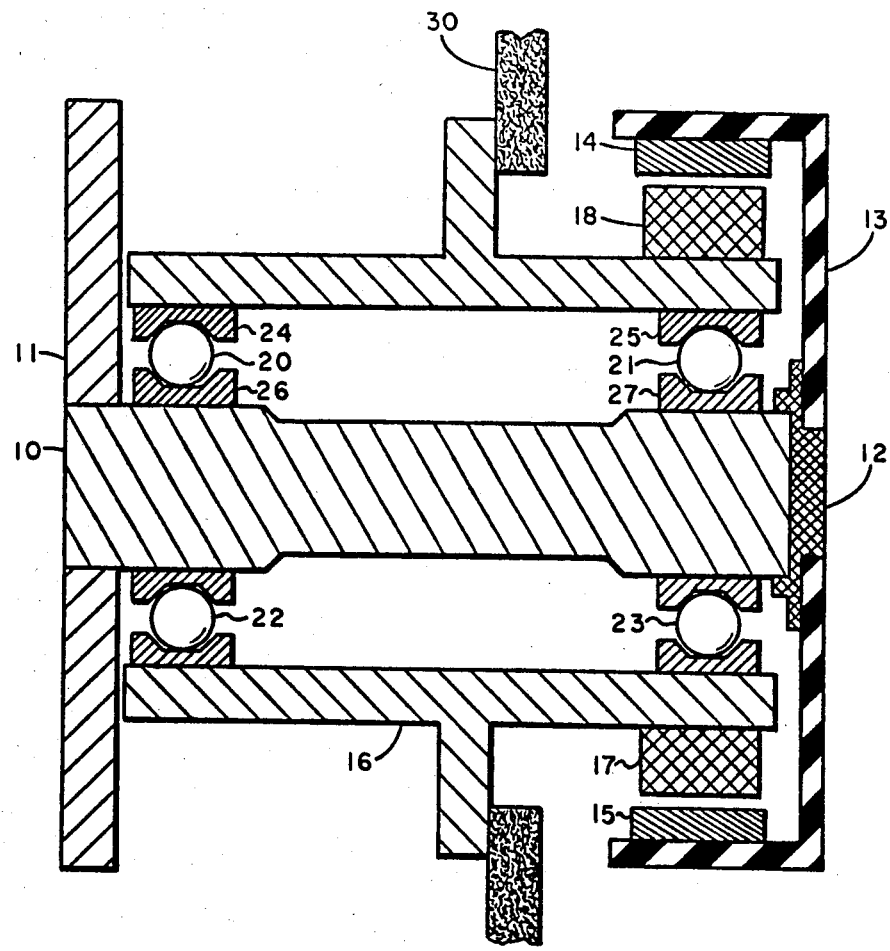
FIG. 1 is a cross-sectional drawing of a brushless direct current motor of the prior art, showing the rotating components that may require balancing and how they are assembled with the stationary components of the motor.

The following is a description of the best presently contemplated mode of carrying out the present invention. This description is given only for the purpose of describing the general principles of the present invention and should not be taken in a limiting sense. The true scope of the invention can be ascertained by referring to the appended claims.

In order to better appreciate the features and advantages of the present invention, it will first be instructive to describe in more detail a conventional brushless direct current motor as used in the prior art for disk drive applications. Such a motor is shown in the cross-sectional view of FIG. 1. The rotating components of the motor consist of the shaft 10, spindle hub 11, cup adapter 12, and rotating magnet cup 13. Mounted on the inner edge of the rotating magnet cup 13 are a plurality of permanent magnets, shown in the figure as solid rectangles 14 and 15.

The stationary components of the motor consist of the spindle housing 16 with a plurality of motor magnets, shown in the figure as rectangles 17 and 18, arranged around the periphery. These magnets re usually electro-magnets that are excited by applying a direct current of a desired polarity to coil windings associated with the magnets.

The shaft 10 of the rotating components is supported in the spindle housing 16 of the stationary components by the ball-bearings 20-27. The ball-bearings can be considered to be part of either the rotating components, the stationary components, or part of neither since typically the inner races (supports for the bearings) 26-27 rotate with the shaft 10, the outer races 24-25 are stationary against the spindle housing 16, and the ball-bearings 20-23 rotate as necessary between the inner and outer races to support the load of the rotating components. While ball-bearings are shown in the figure, it is not uncommon for any appropriate rotational bearing mechanism, e.g., roller bearing, tapered pin bearings, etc., to be used.

The spindle housing 16 of the stationary components is attached to the mount 30 of the mechanical structure of the equipment in which the motor is being used. The manner of mounting is not important to the present invention.

It is noted that in a traditional direct current motor, (*not* a brushless motor), the magnets are part of the stationary portion of the motor. These magnets may be permanent or electro-magnets which are excited by the application of the proper direct current through coils built into the motor housing. The motor windings are part of the rotating portion of the motor. Direct current is supplied to the windings through a commutator, i.e., slotted, insulated segments of copper (or other conductive material), which is made part of the rotating shaft, through carbon brushes which rub against the commutator. Pairs of segments of the commutator are electrically connected to individual pairs of motor windings. Electrical currents in a pair of motor windings create a magnetic field which opposes the magnetic field of the fixed magnets in the stationary part of the motor, thus creating torsional forces that cause the shaft to rotate. As the shaft, and therefore the commutator, rotates a different pair of motor windings receive the current from the commutator, thereby allowing the torsional forces, and hence shaft rotation to continue. Traditional direct current motors are heavy and bulky, and precise speed control is difficult to achieve.

In contrast, the motor windings of a brushless direct current motor are part of the stationary component of the motor and the permanent magnets are part of the rotating components. In order to develop the most torque, the permanent magnets are typically spaced radially from the center line of the shaft as far as possible. Hence, a magnet cup assembly 13, as shown in FIG. 1, is employed to place the magnets at a maximum radial spacing, rather than merely attaching the magnets to the side of the shaft 10. Thus in FIG. 1, the permanent magnets 14-15 are placed a maximum distance from the centerline of the shaft 10 and opposite the motor windings 17-18. Direct current is electronically switched to the appropriate pair of motor windings to create a magnetic force which causes the permanent magnets, and therefore all the rotating components of the motor, to rotate.

Advantageously, the rotational speed of the brushless motor can easily be measured. For example, a slotted plate could be made part of the rotating portion of the motor. As the slots of such a plate pass between a light source and a photosensitive diode, a pulse train whose frequency is proportional to the rotational speed of the motor is created. This pulse train can be used to control the switching of current to the motor windings and thus accurately control the speed of the motor.

Therefore, the ability to precisely control the speed of a brushless direct current motor allows such motors to be used in many applications where a conventional direct current motor would not be acceptable, such as in a disk drive device. Such applications also require, however, a precise balance of the rotating components. As explained earlier, while it is possible to precisely balance a motor such as that shown in FIG. 1, this balance will be lost if the motor is disassembled. To explain further, the shaft 10 and spindle hub 11 (see FIG. 1) are fabricated from separate pieces of metal. The spindle hub 11 is then attached permanently, e.g., by means of an interference fit, to the shaft 10. The resultant subassembly is then dynamically balanced. This balancing is typically done by spinning the object at the desired speed, and measuring the amount of imbalance, for example with a strobe light. The object is stopped and an amount of material, estimated to be equal to the imbalance, is removed from the proper area of the object, usually by machining or drilling the surface. The object is again spun and any imbalance is again determined. This process is repeated until the amount of remaining imbalance is within a predetermined limit.

The cup adapter 12 and rotating magnet cup 13 must be balanced in a similar manner. When all the rotating components 10-15 are balanced, the rotating components re assembled with the stationary components, and a complete motor assembly is realized. Depending upon the amount of imbalance allowed by the application, the resulting complete motor assembly may require additional balancing. Also, as explained previously, if the motor should ever have to disassembled, a strong possibility exists, dependent upon the care and cost expended in fabricating the rotating parts, that upon reassembly balancing will again be required.

Figure 2:
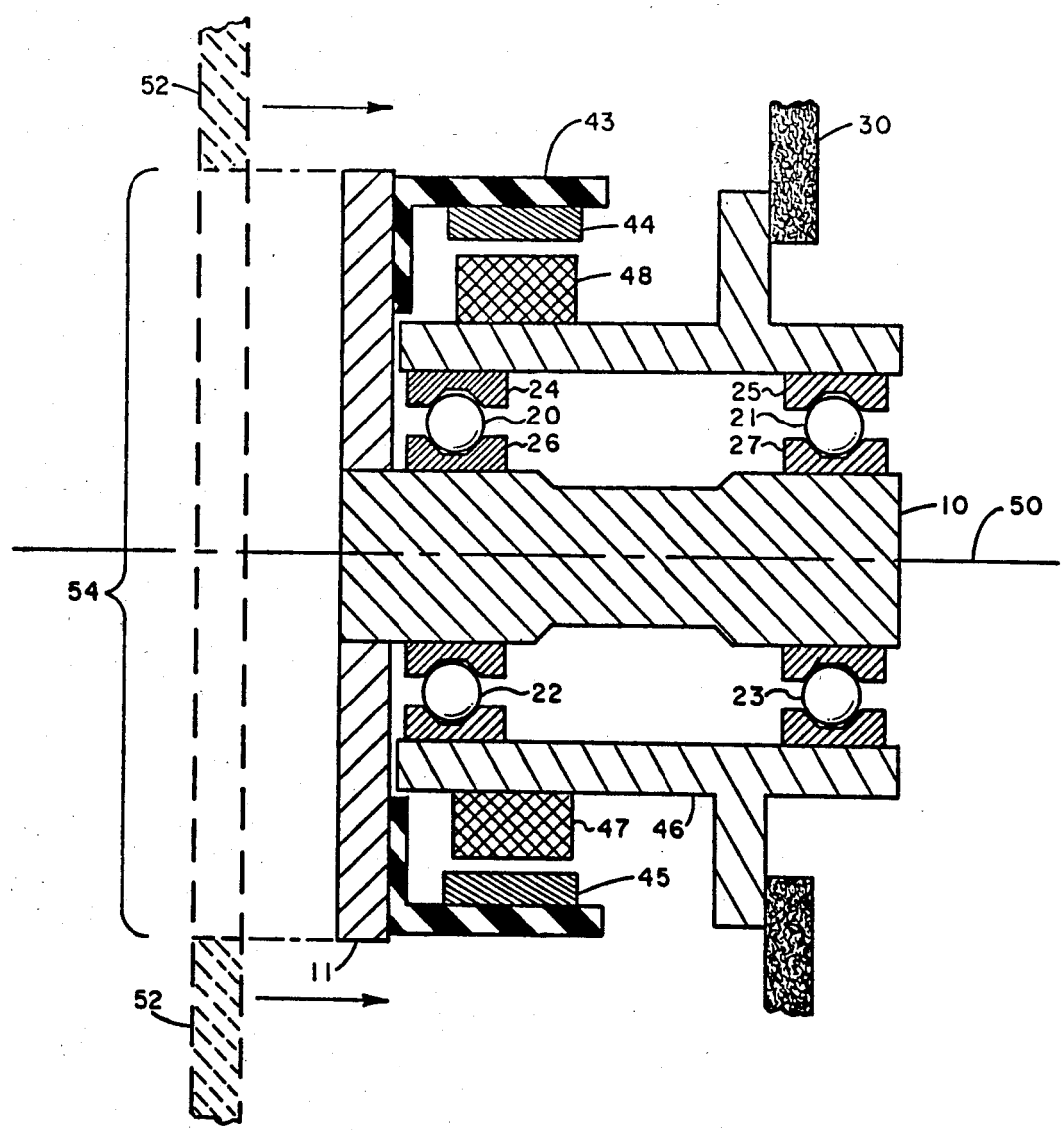
FIG. 2 is a cross-sectional drawing of a brushless direct current motor designed according to of the present invention, showing the same detail as FIG. 1.

FIG. 2 is a cross-sectional drawing of a brushless direct current motor configured according to the present invention. As can be seen from the figure, a rotating magnet cup 43, along with the permanent magnets 44-45, are attached to a spindle hub 11 within the periphery thereof instead of to the opposite end of the shaft 10 (as taught in the prior art), and the motor windings 47-48 are located at the spindle hub end of a spindle housing 46. The magnets 44-45 (which may be a single doughnut shaped core piece that is selectively magnetized, or a plurality of individual magnetized pieces) are mounted in the cup 43 so as to maintain a selected juxtaposed relationship (depending upon the rotational position of the shaft) with an outer surface of the motor windings 47-48. The shaft 10 is rotatably mounted in an opening extending through the housing 46 on two non-resilient friction reducing bearings 20-27 respectively placed at each end of the shaft 10 and the corresponding ends of the opening in the housing 46 and rotates about an axis 50. A disk 52, typically having a center hole 54 therein, engages the upper side of the spindle hub 11 when the motor is used for disk drive applications.

These features of the invention advantageously allow all the rotating components of the motor, i.e., the shaft 10, the spindle hub 11, rotating magnet cup 43, and permanent magnets 44-45 to be manufactured using conventional manufacturing practices. No additional costs are incurred just because the components are going to be balanced. The rotating components are then assembled into a single compact subassembly. This subassembly is then balanced in the manner described above. That is, the subassembly comprising the shaft 10, spindle hub 11, and motor cup 43, and magnets 44-45 is dynamically rotated about the axis 50. Any imbalance can be sensed in the form of vibration. When a stroboscoic light is synchronized to the rate of rotation, a correlation can be drawn between the vibration and the location of the unevenly distributed mass causing the vibration. Mass can then be appropriately added or removed in order to eliminate the imbalance. The balanced subassembly can then be installed into the stationary components of the motor.

A unique feature of the present invention is that once the rotating components are joined together in a subassembly, there is never a need to disassemble them. Thus, once balanced, the rotating subassembly can be installed, and removed and reinstalled, in the motor without requiring additional balancing. This feature significantly reduces the cost of manufacturing and maintaining the motor assembly because only one subassembly need be balanced, and that need only be balanced one time.

While seemingly a simple change, placing the rotating magnetic cup 43, permanent magnets 44-45, and motor windings 47-48 at the spindly hub end of the motor housing as shown in FIG. 2 represents a significant advance in the art. Prior art disk drive brushless motors as shown in FIG. 1 have placed the magnetic cup 43 at the opposite end of the shaft from the spindle in order to more evenly distribute the motor inertia along the length of the shaft. Such inertia distribution is necessary, as taught in the art, in order to properly distribute the rotational shaft stresses along the full length of the shaft and in order to maintain a moment of inertia that is more or less centered within the motor housing. However, coupling most of the motor inertia to one end of the shaft in accordance with the present invention as shown in FIG. 2 does not create a problem as the prior art teachings would suggest. It is believed that the reason for this is that *achieving* and *maintaining* a proper dynamic balance, in a simple and inexpensive manner as is done with the configuration of the present invention, results in much less wear and strain of the type that would otherwise make uneven motor inertia distribution (i.e., most of the motor inertia coupled to one end of the shaft) significant.

Figure 3:
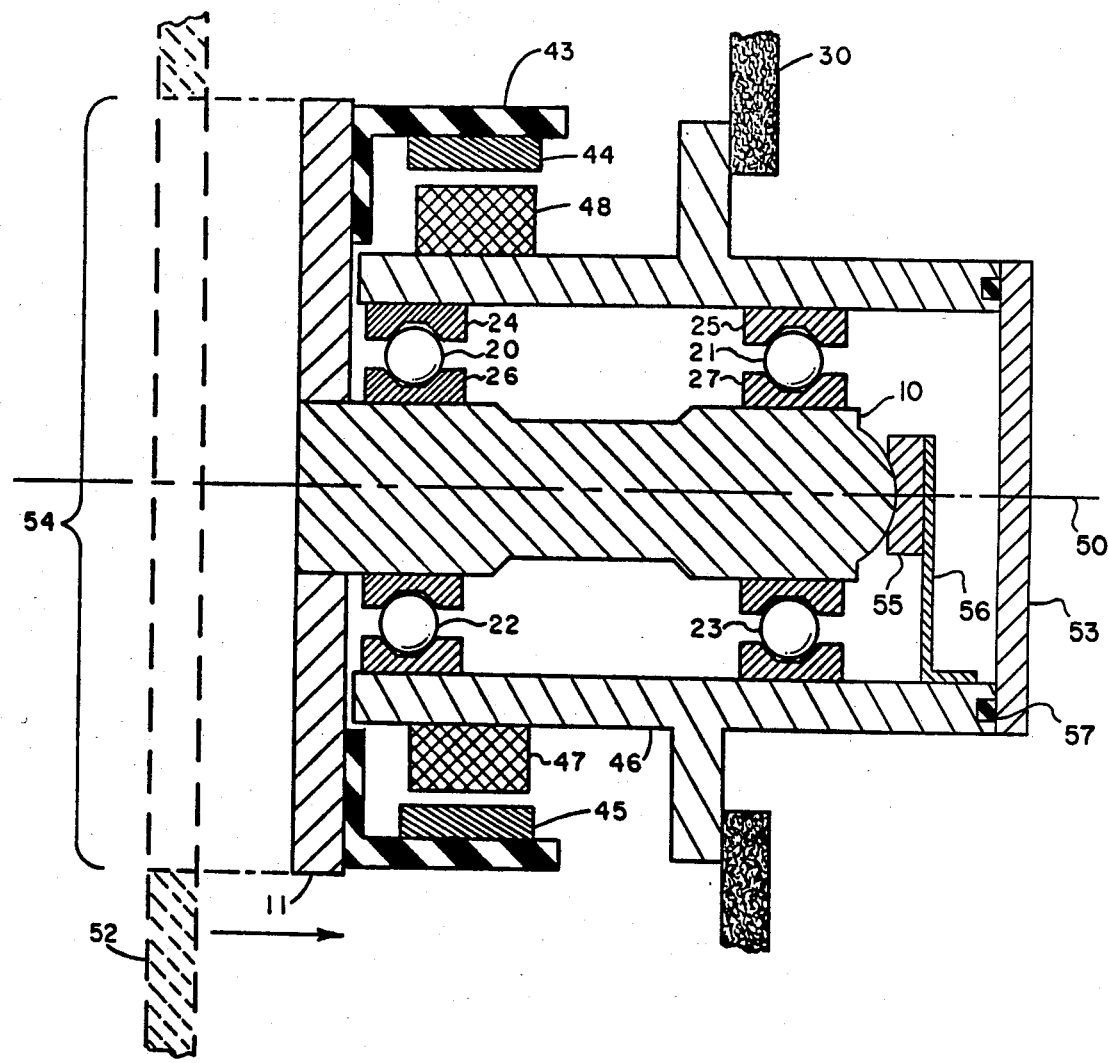
FIG. 3 is a cross-sectional drawing as in FIG. 2, further including a ground brush spring and sealing end cap.

Additional improvements and features of the brushless direct current motor of the present invention are shown in FIG. 3. A ground brush 55, connected to a ground brush spring 56, electrically connects the rotating shaft to the motor housing 46, which housing is electrically grounded. Thus, an electrical discharge path is provided through which static charges may be conducted to ground. Such static charges are common in disk drive devices because of the rotating disk in air. If a proper discharge path is not provided, the static charge is conducted to ground through the bearings 20-27. Discharge through the bearings, if allowed to continue over time, disadvantageously etches and eventually destroys the rolling elements and raceways.

Also shown in FIG. 3 are a sealing O-ring 57 and cap 58. While O-rings and end caps are common in the art for various uses, applicants are not aware of these uses in connection with a brushless direct current motor as shown in FIG. 3. The static seal thus created is extremely effective in preventing the rotating spindle and disk from pulling air into the motor housing through the bearings, which air flow action can significantly impact the disk drive operation, as explained above in the BACKGROUND portion of this application.

The results obtained to date by using the motor configuration shown in FIG. 3 have been surprisingly and unexpectedly good. Accordingly, because of the numerous advantages it provides, the present invention is planned for use in many of the disk drive products manufactured by the inventors' employer.

While the invention herein disclosed has been described by means of specific embodiments and applications thereof, numerous modifications and variations could be made thereto by those skilled in the art all of which modifications are intended to be covered within the scope of the appended claims.

What is claimed is:

1. An improved, low cost, compact brushless direct current motor for use in a disk drive device comprising:
    a housing having motor windings selectively spaced around an outer surface thereof, and means for mounting said housing to said disk drive device;
    a shaft rotatably mounted in an opening extending through said housing, said rotatable mounting being realized with at least two non-resilient friction reducing bearings respectively placed at each end of said shaft and at corresponding ends of said opening in said housing;

a spindle hub affixed to a first end of said shaft, and upper side of said spindle hub being adapted for engagement with the center of a disk to be driven by said motor;

a magnet cup attached to said spindle hub, said magnet cup including at least one permanent magnet, said magnet cup being positioned within the periphery of said spindle hub such that said magnet maintains a selected juxtaposed, non-touching, relationship with an outer surface of said motor windings; and means for sealing said opening in said housing at a second end of said shaft, whereby air is prevented from being pulled into the housing at the end opposite said spindle hub as said shaft and spindle hub rotate.

2. The motor as defined in claim 1 further including static discharge means for providing an electrical path through which static charges, accumulating on said spindle and shaft hub, are conducted to said housing without passing through said bearings.

3. The motor as defined in claim 2 wherein said static discharge means comprises a ground brush pushed against the second end of said shaft by a ground brush spring, said ground brush spring being secured to the inside of said housing.

4. The motor as defined in claim 1 wherein said sealing means comprises an end cap sealably connected to the end of said housing opposite said spindle hub.

5. The motor as defined in claim 4 further including an O-ring positioned around the end of said housing to which the end cap is attached, said O-ring providing seal between said housing and said end cap.

6. An improved, low cost, compact brushless direct current motor for use in a disk drive device comprising:

a housing having motor windings selectively spaced around an outer surface thereof, and means for mounting said housing to said disk drive device;

a shaft rotatably mounted in an opening extending through said housing, said rotatable mounting being realized with at least two non-resilient friction reducing bearings respectively placed at each end of said shaft and at corresponding ends of said opening in said housing;

a spindle hub affixed to a first end of said shaft, an upper side of said spindle hub being adapted for engagement with the center of the disk to be driven by said motor; and a magnet cup attached to said spindle hub, said magnet cup including at least one permanent magnet, said magnet cup being positioned within the periphery of said spindle hub such that said magnet maintains a selected juxtaposed, non-touching, relationship with an outer surface of said motor windings.

* * * * *